United States Patent
Hatakeyama

(10) Patent No.: US 12,105,296 B2
(45) Date of Patent: Oct. 1, 2024

(54) METHOD OF ADJUSTING VEHICLE DISPLAY DEVICE AND VEHICLE DISPLAY DEVICE

(71) Applicant: YAZAKI CORPORATION, Tokyo (JP)

(72) Inventor: Masaya Hatakeyama, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/451,059

(22) Filed: Aug. 16, 2023

(65) Prior Publication Data

US 2024/0069353 A1 Feb. 29, 2024

(30) Foreign Application Priority Data

Aug. 25, 2022 (JP) .................. 2022-133744

(51) Int. Cl.
| | |
|---|---|
| *G02B 27/01* | (2006.01) |
| *B60K 35/00* | (2024.01) |
| *B60K 35/23* | (2024.01) |
| *B60K 35/81* | (2024.01) |
| *G09G 3/00* | (2006.01) |

(52) U.S. Cl.
CPC ......... *G02B 27/0179* (2013.01); *G09G 3/002* (2013.01); *B60K 35/00* (2013.01); *B60K 35/23* (2024.01); *B60K 35/81* (2024.01); *B60K 2360/23* (2024.01); *G09G 2320/0693* (2013.01); *G09G 2340/0464* (2013.01); *G09G 2380/10* (2013.01)

(58) Field of Classification Search
CPC ............ G02B 27/0179; G02B 27/01; G02B 27/0101; G02B 2027/011; G02B 2027/0129; G09G 3/002; G09G 2320/0693; G09G 2340/0464; G09G 2380/10; G09G 5/00; G09G 2354/00; B60K 35/00; B60K 35/23; B60K 35/81; B60K 35/90; B60K 2360/23
See application file for complete search history.

(56) References Cited

U.S. PATENT DOCUMENTS

2016/0320616 A1* 11/2016 Ichii ................... G02B 27/0179
2018/0267306 A1* 9/2018 Nakamura ......... G02B 27/0179

FOREIGN PATENT DOCUMENTS

| JP | 2011-209457 A | 10/2011 |
| JP | 2015-22013 A | 2/2015 |
| JP | 2018-156063 A | 10/2018 |

* cited by examiner

*Primary Examiner* — Brent D Castiaux
(74) *Attorney, Agent, or Firm* — KENEALY VAIDYA LLP

(57) ABSTRACT

A method of adjusting a vehicle display device includes: performing a first inspection, calculating a first correction value, and writing the first correction value into a non-volatile memory of the vehicle display device; and performing a second inspection, calculating a second correction value, and writing the second correction value into the non-volatile memory of the vehicle display device, each of the first correction value and the second correction value is a value with which an image display area is corrected so that a tilt of an axis of the image is reduced, and in the second inspection, the display device displays an image to the image display area that has been corrected with the first correction value.

4 Claims, 13 Drawing Sheets

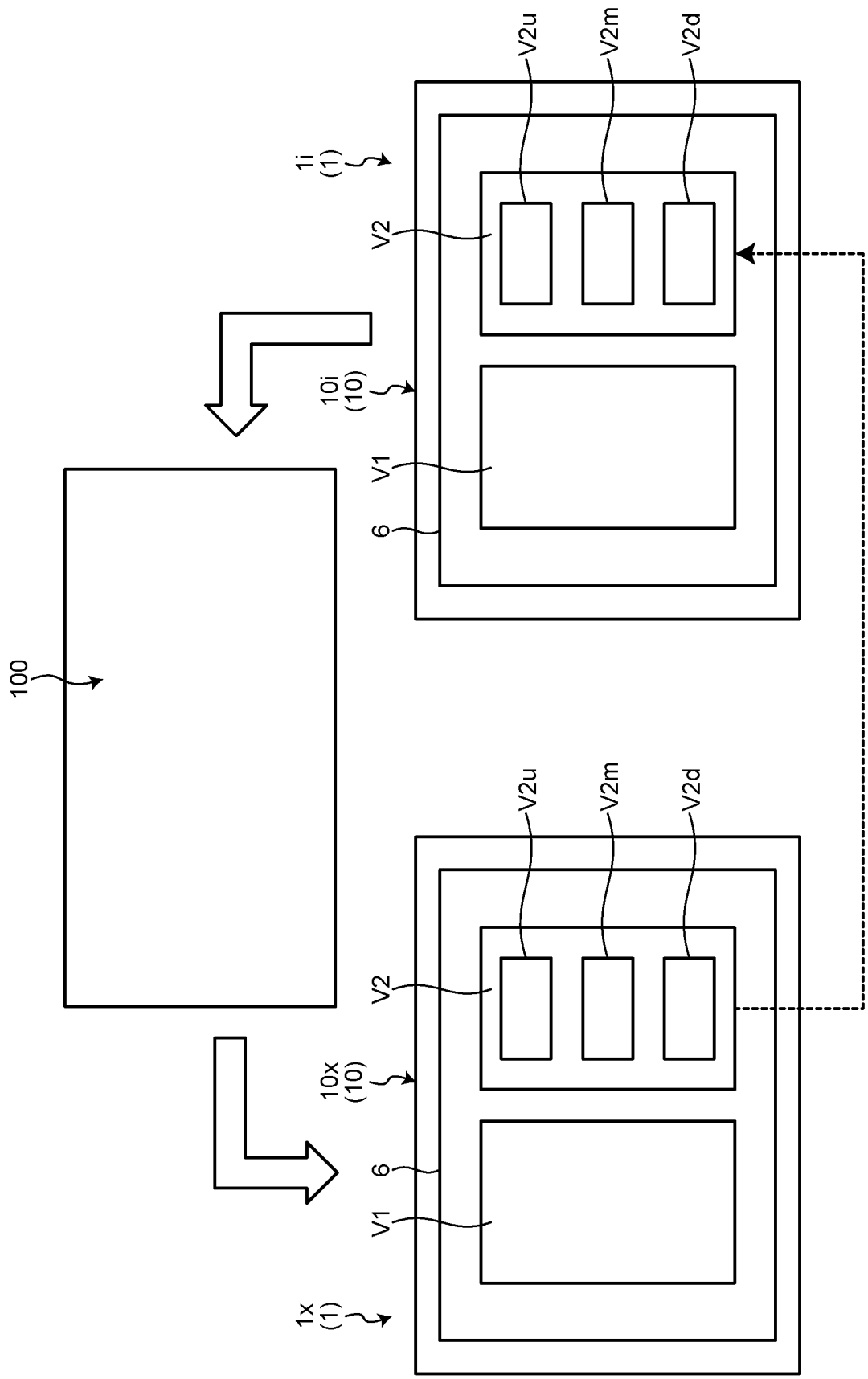

METHOD OF ADJUSTING VEHICLE DISPLAY DEVICE AND VEHICLE DISPLAY DEVICE

CROSS-REFERENCE TO RELATED APPLICATION(S)

The present application claims priority to and incorporates by reference the entire contents of Japanese Patent Application No. 2022-133744 filed in Japan on Aug. 25, 2022.

BACKGROUND OF THE INVENTION

1. Field of the Invention

The present invention relates to a method of adjusting a vehicle display device and a vehicle display device.

2. Description of the Related Art

According to a technology in the related art, a virtual image is corrected. It is disclosed in Japanese Patent Application Laid-open No. 2018-156063 that a display device is provided with an intermediate image formation unit that forms an intermediate image on a screen, a projection unit that projects the intermediate image toward a transparent reflective member to display a virtual image, an input unit that inputs virtual image information on the virtual image, and a correction unit that causes the intermediate image to rotate in the screen so as to correct a defect of the virtual image based on the virtual image information.

In a vehicle display device, it is desirable to be able to efficiently adjust positional displacement due to a tilt of an image. For example, in a case in which the positional displacement is adjusted by mechanical means, such as by adjusting a position of a part or an installation state of a housing, the work procedure in an adjustment step tends to be complicated. In the vehicle display device, it has been desired to be able to efficiently adjust positional displacement due to a tilt of an image.

SUMMARY OF THE INVENTION

An objective of the present invention is to provide a method of adjusting a vehicle display device, which enables efficient adjustment for the positional displacement due to a tilt of an image, and a vehicle display device.

In order to achieve the above mentioned object, a method of adjusting a vehicle display device according to one aspect of the present invention includes performing a first inspection on a vehicle display device capable of changing a projection position of an image onto a windshield in an up-and-down direction, calculating a first correction value, and writing the first correction value into a non-volatile memory of the vehicle display device; and performing a second inspection on the vehicle display device, calculating a second correction value, and writing the second correction value into the non-volatile memory of the vehicle display device, wherein each of the first correction value and the second correction value is a value with which an image display area is corrected with respect to a display device of the vehicle display device so that a tilt of an axis of the projection image is reduced with respect to a regular axis direction of an image horizontal direction or an image vertical direction, in the first inspection, the vehicle display device is installed on an inspection table and projects an image onto a windshield for inspection, and the first correction value is calculated based on a displacement amount according to a tilt of an axis of the image with respect to the regular axis direction when the image is projected onto the windshield for inspection, in the second inspection, the vehicle display device is installed in the vehicle and projects an image onto the windshield of the vehicle, and the second correction value is calculated based on a displacement amount according to a tilt of an axis of the image with respect to the regular axis direction when the image is projected onto the windshield of the vehicle, and in the second inspection, the display device displays an image to the image display area that has been corrected with the first correction value.

In order to achieve the above mentioned object, a vehicle display device according to another aspect of the present invention includes an image display unit that is mounted in a vehicle and capable of changing a projection position of an image onto a windshield in an up-and-down direction, wherein the image display unit includes a display device that displays an image, a mirror that reflects display light of the image toward the windshield a non-volatile memory that stores a first correction value and a second correction value, and a control unit that controls the display device, wherein the control unit corrects, based on the first correction value and the second correction value, an image display area of the display device according to the projection position of the image in the up-and-down direction with respect to the windshield, the correction on the image display area of the display device is a correction for reducing a tilt of an axis of a projection image with respect to a regular axis direction of an image horizontal direction or an image vertical direction, the first correction value is a correction value based on an inspection result for the stand-alone image display unit that is not mounted in the vehicle, and the second correction value is a correction value based on an inspection result for the image display unit that is mounted in the vehicle and based on an inspection result for the image display unit which the image display area has been corrected with the first correction value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a diagram illustrating the replacement of an image display unit.

DETAILED DESCRIPTION OF THE PREFERRED EMBODIMENTS

Hereinbelow, a method of adjusting a vehicle display device and a vehicle display device according to embodiments of the present invention will be described in details with reference to the drawings. The present invention is not limited to the embodiments. The components in the following embodiments include those that can be readily assumed by those skilled in the art or are substantially the same.

EMBODIMENTS

Figure 1:
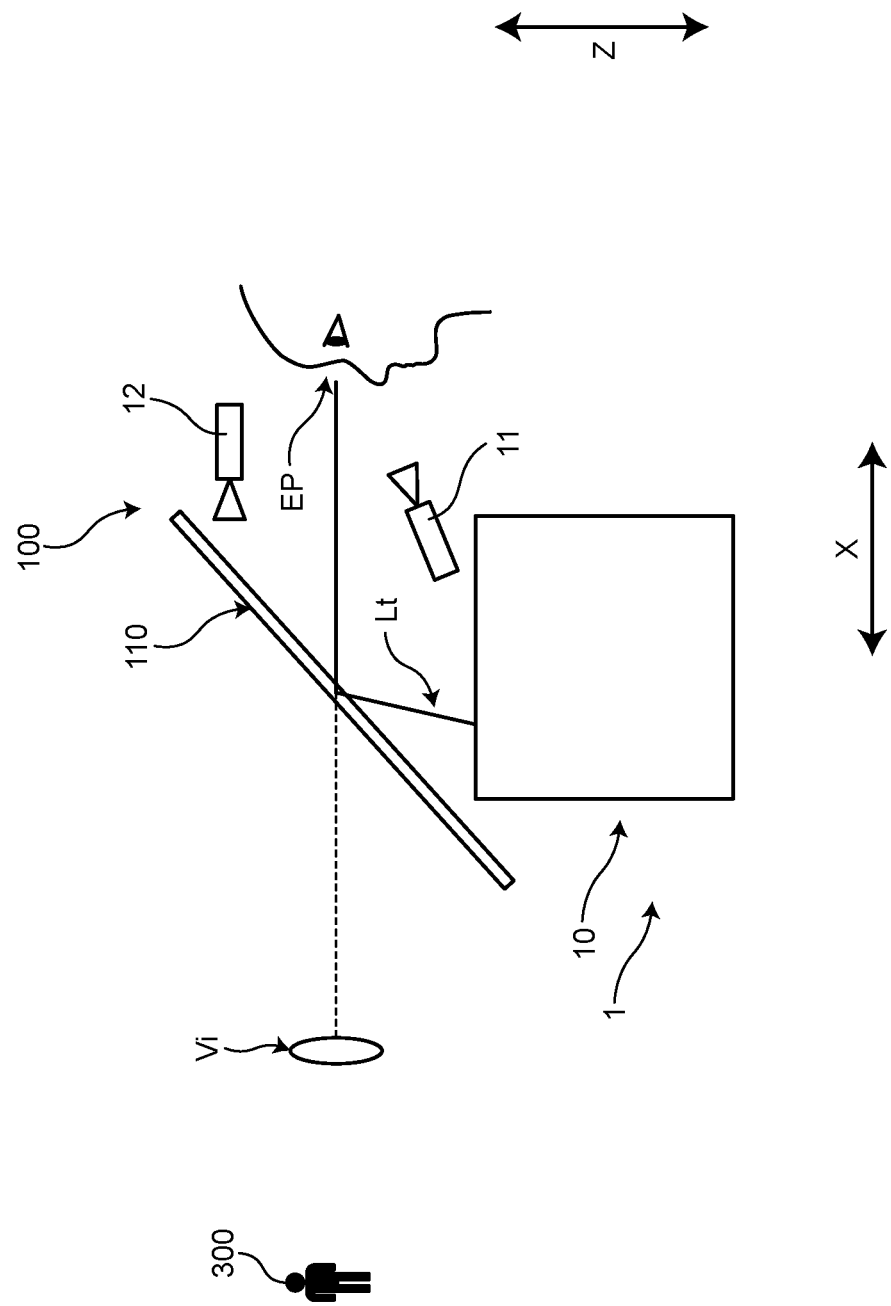
FIG. 1 is a diagram illustrating a virtual image displayed by a vehicle display device according to the present embodiment.
Figure 2:
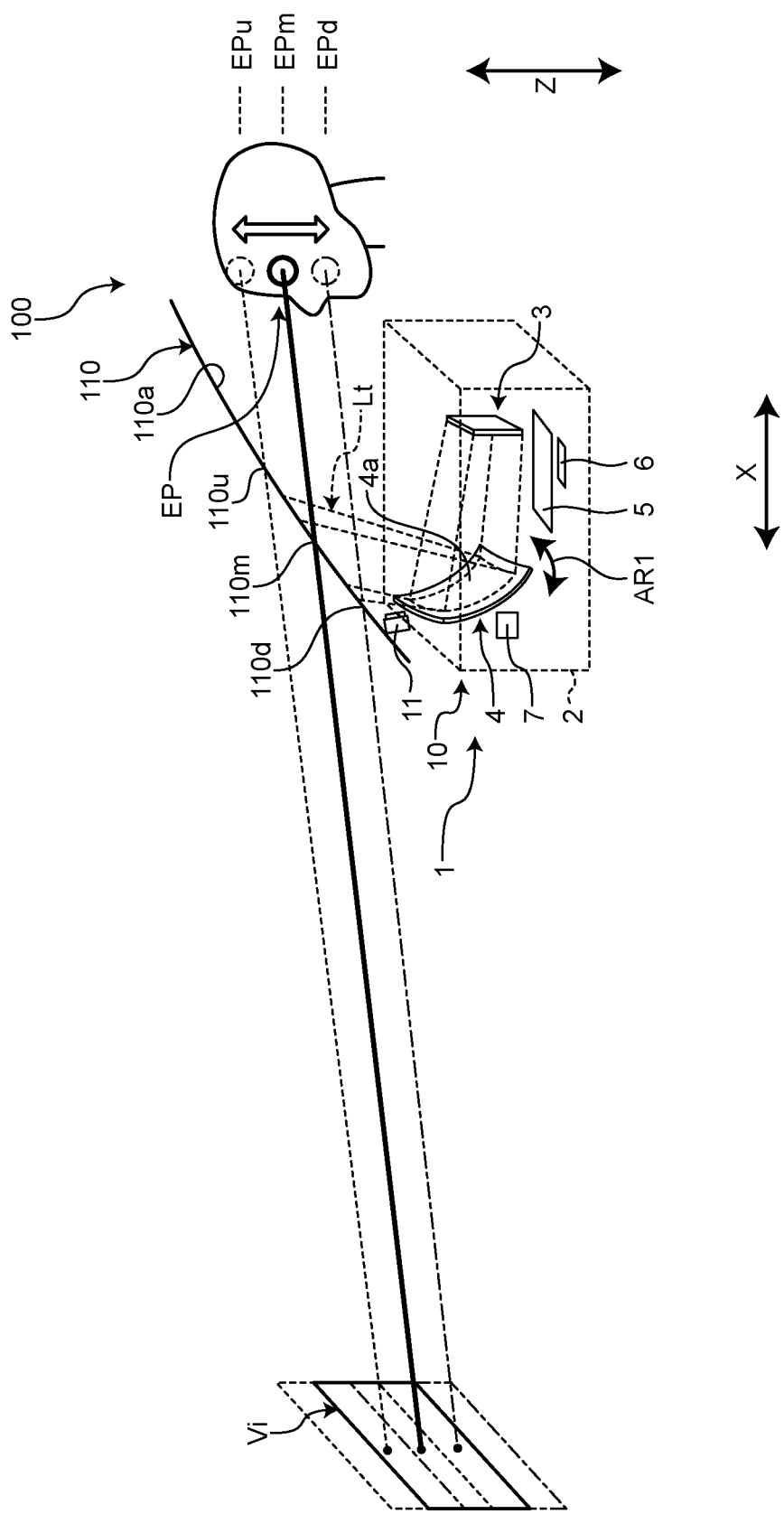
FIG. 2 is a diagram illustrating the vehicle display device according to the embodiment.
Figure 3:
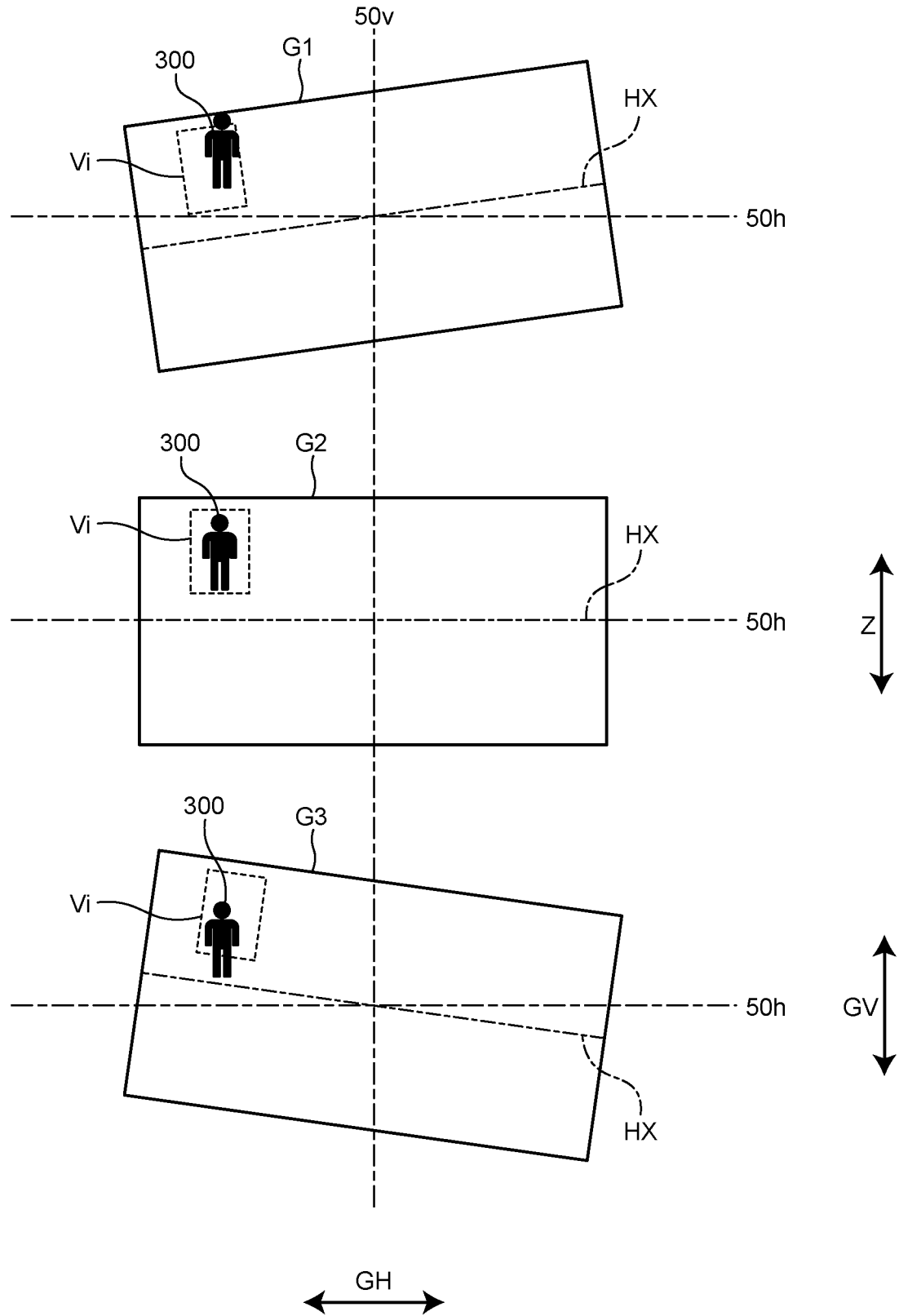
FIG. 3 is a diagram illustrating displacement of the virtual image.
Figure 4:
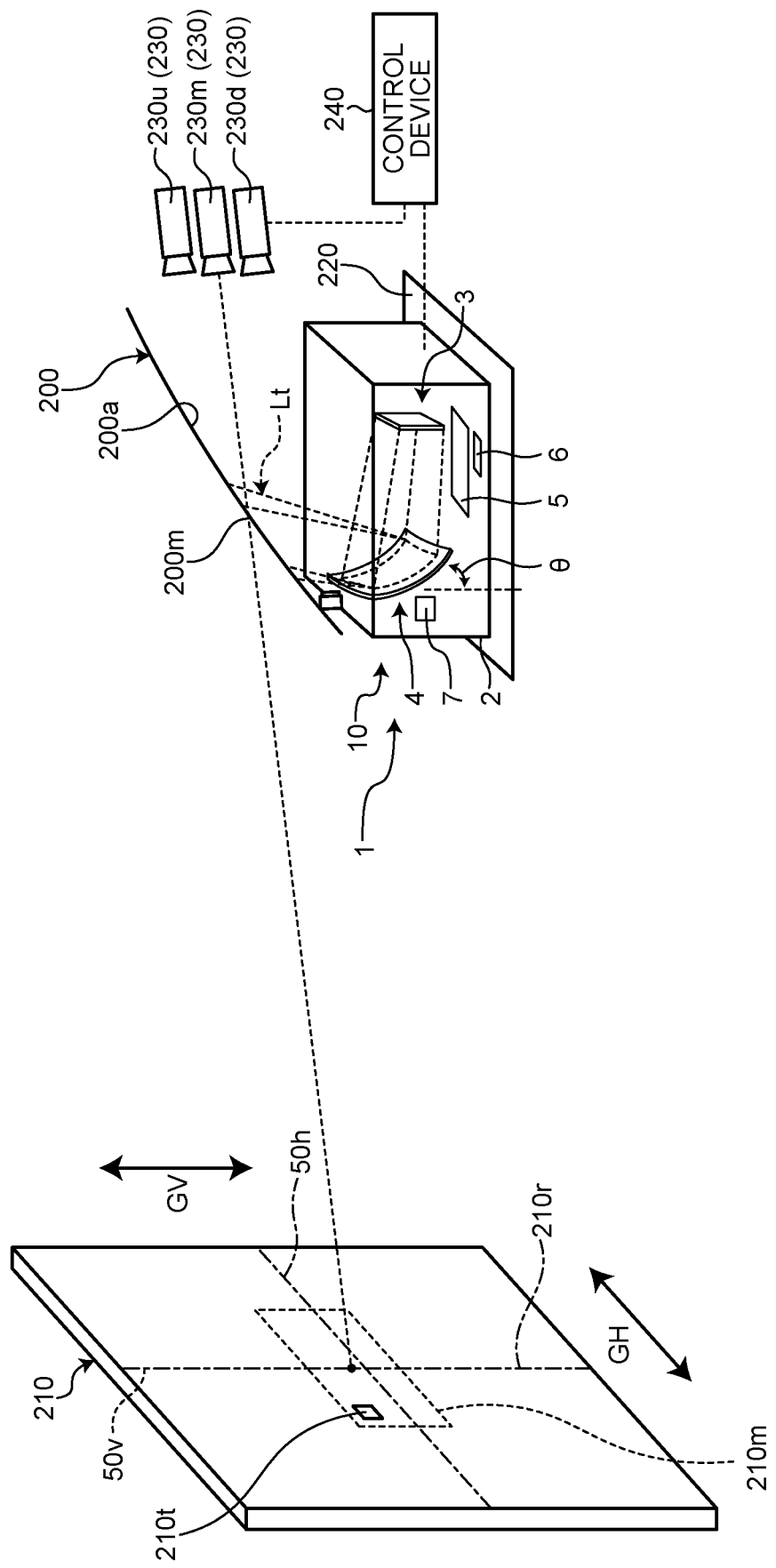
FIG. 4 is a diagram illustrating a first adjustment step according to the embodiment.
Figure 5:
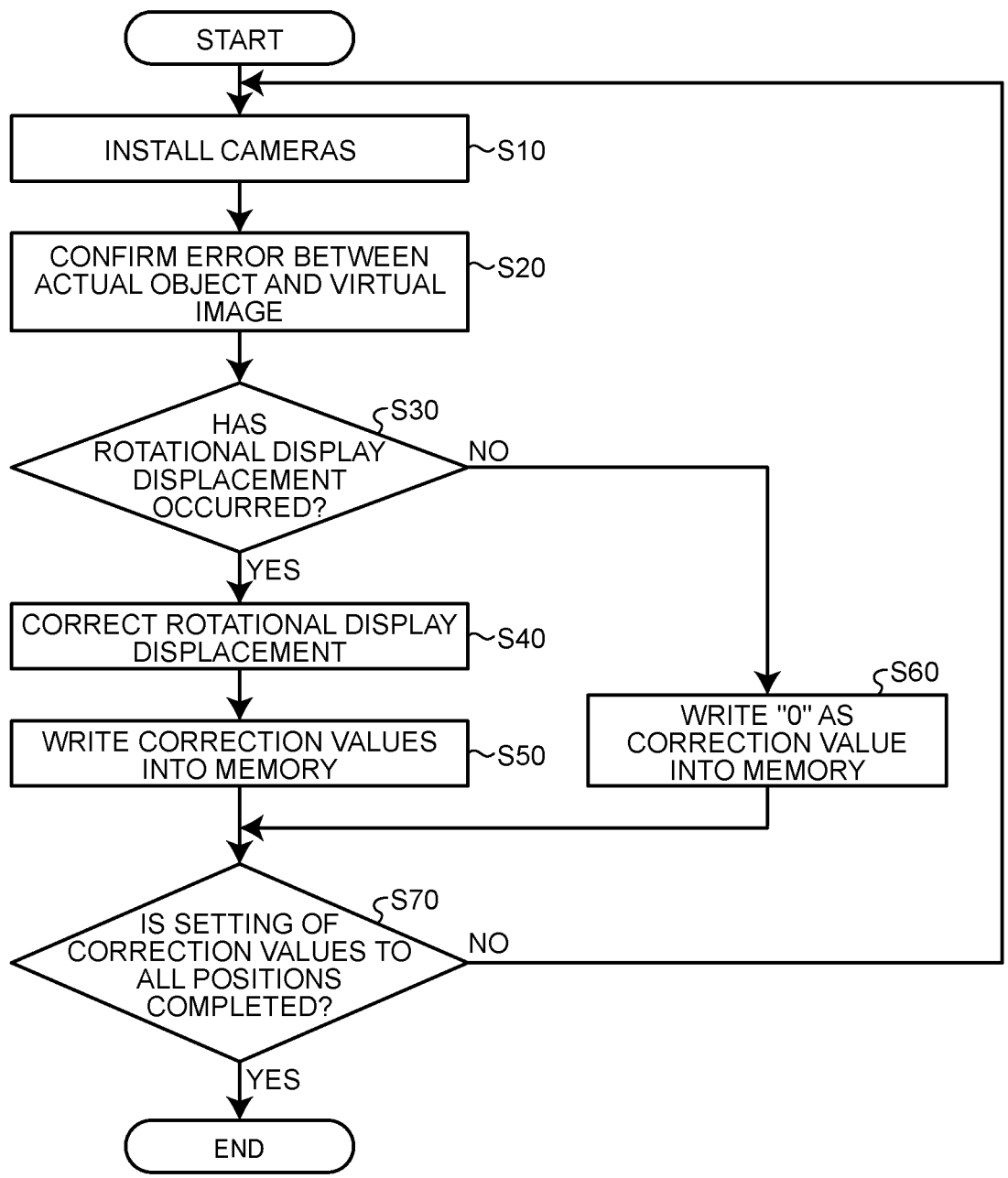
FIG. 5 is a flowchart for an adjustment step according to the embodiment.
Figure 6:
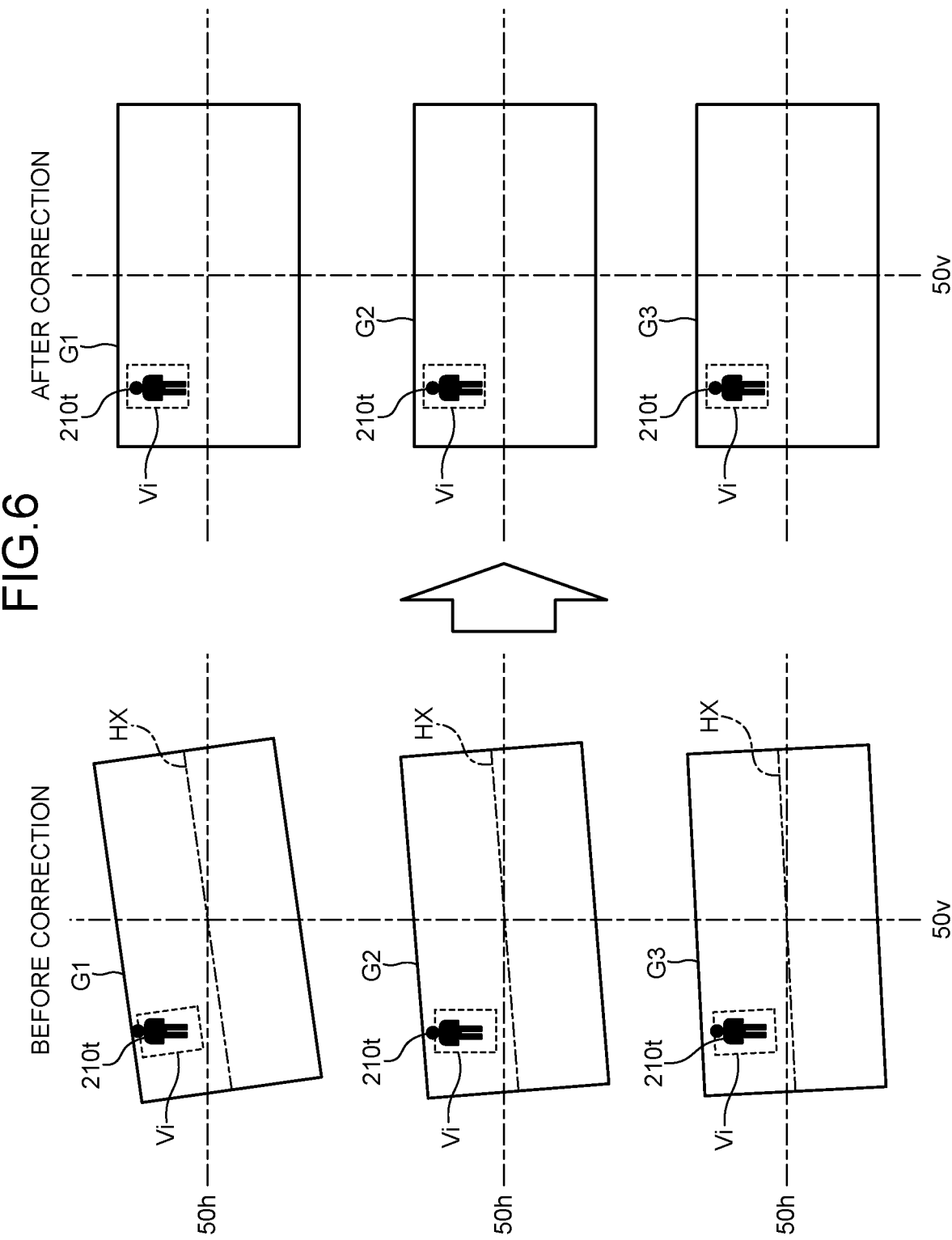
FIG. 6 is a diagram illustrating images before and after correction.
Figure 7:
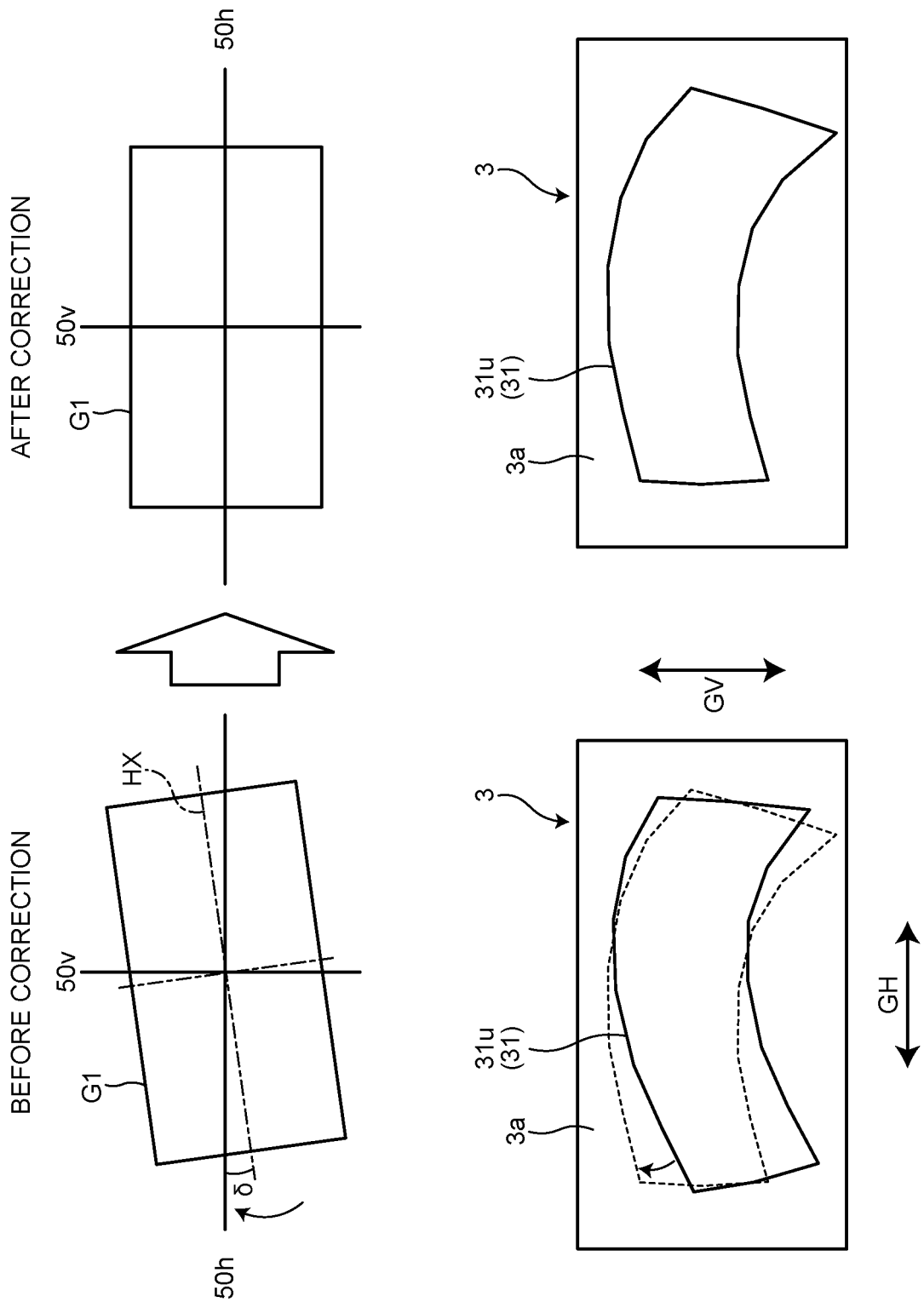
FIG. 7 is a diagram illustrating the correction of an image display area.
Figure 8:
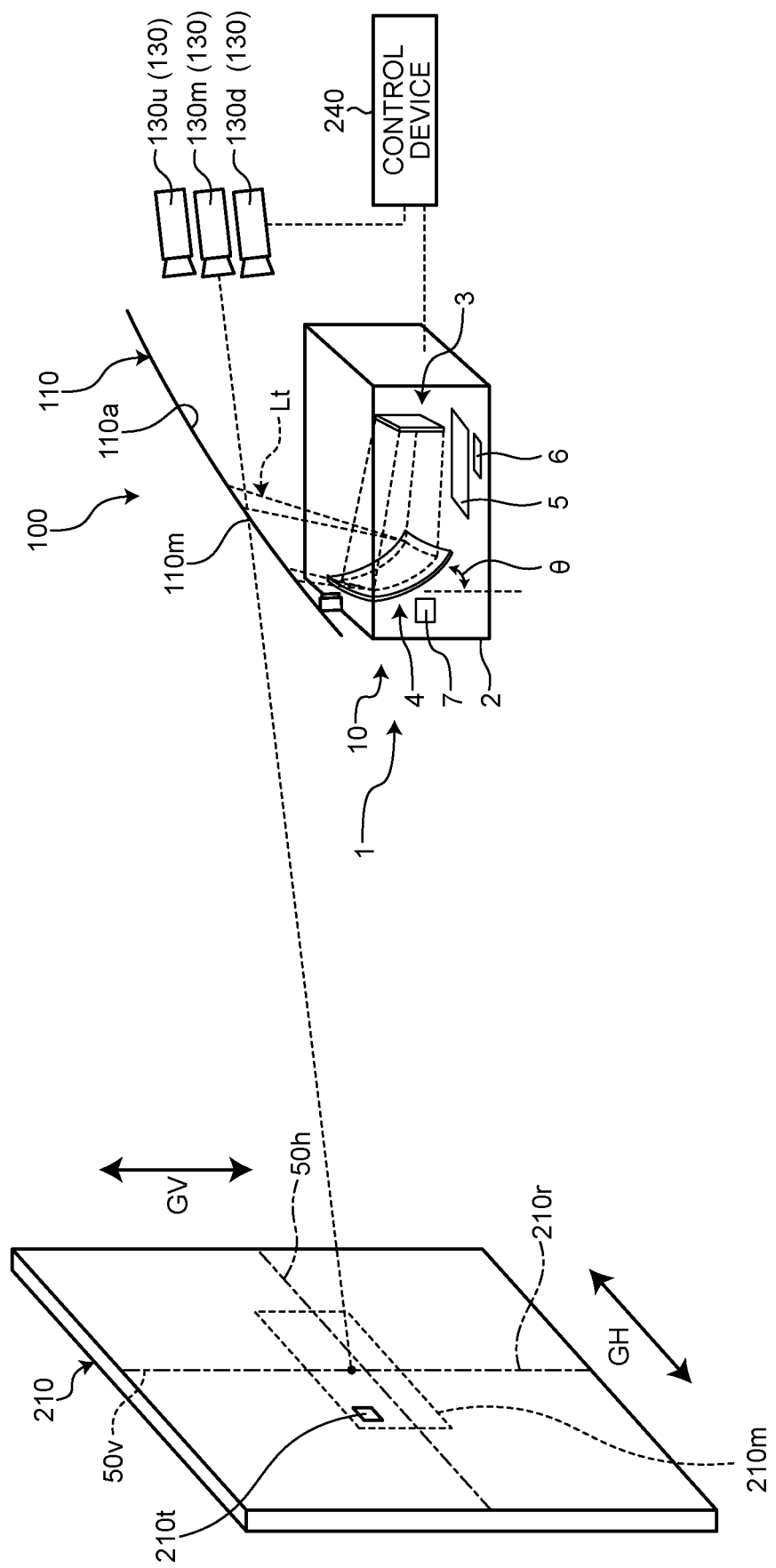
FIG. 8 is a diagram illustrating a second adjustment step according to an embodiment.
Figure 9:
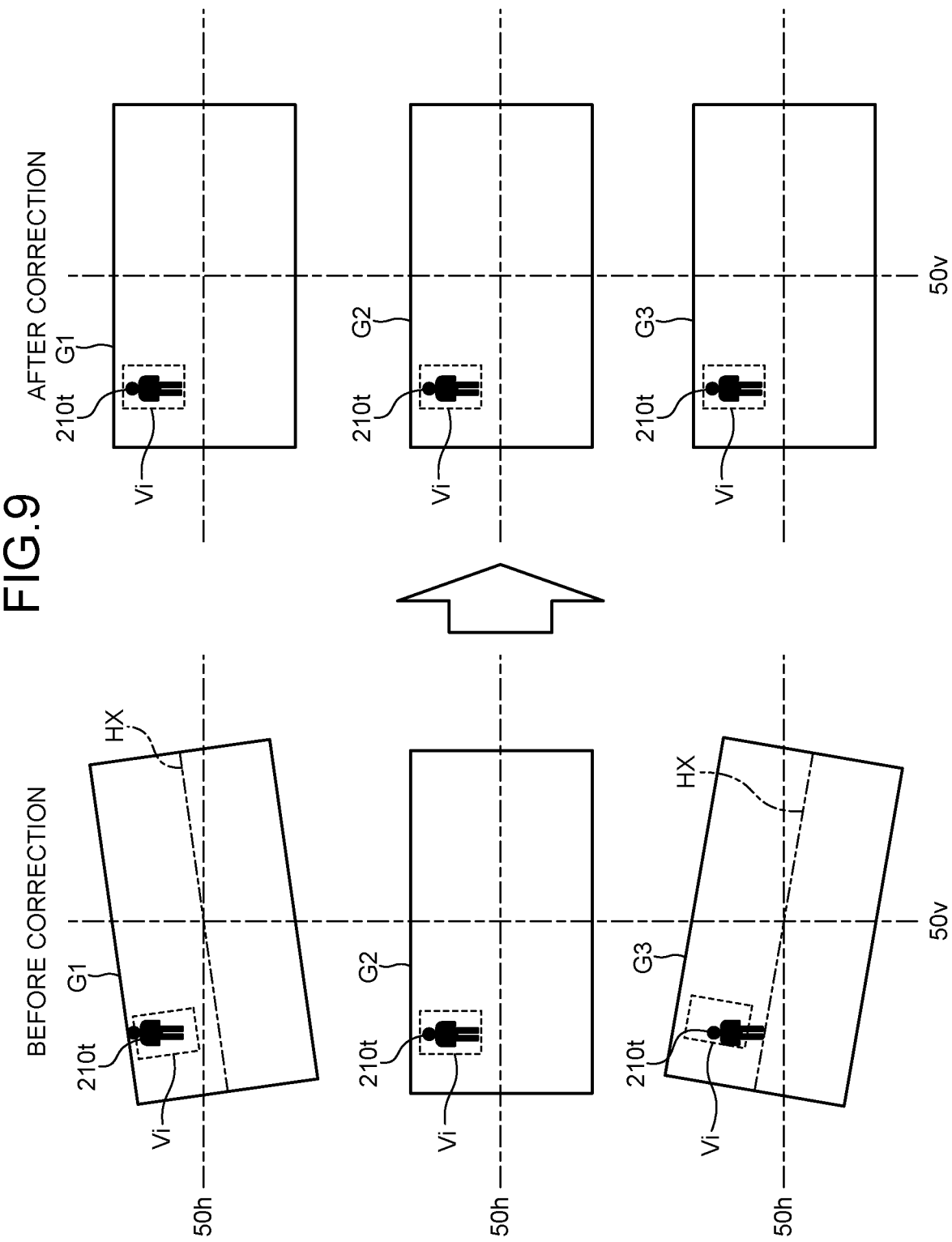
FIG. 9 is a diagram illustrating images before and after correction.
Figure 10:
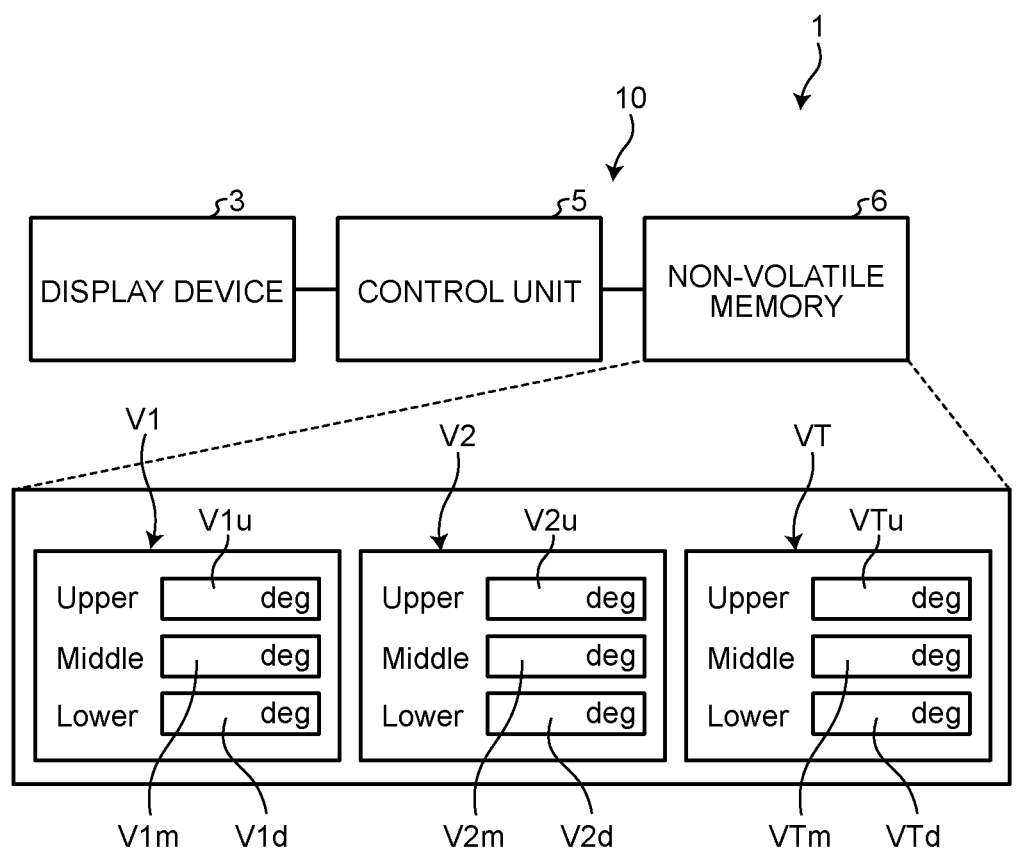
FIG. 10 is a block diagram illustrating the vehicle display device according to the embodiment.
Figure 11:
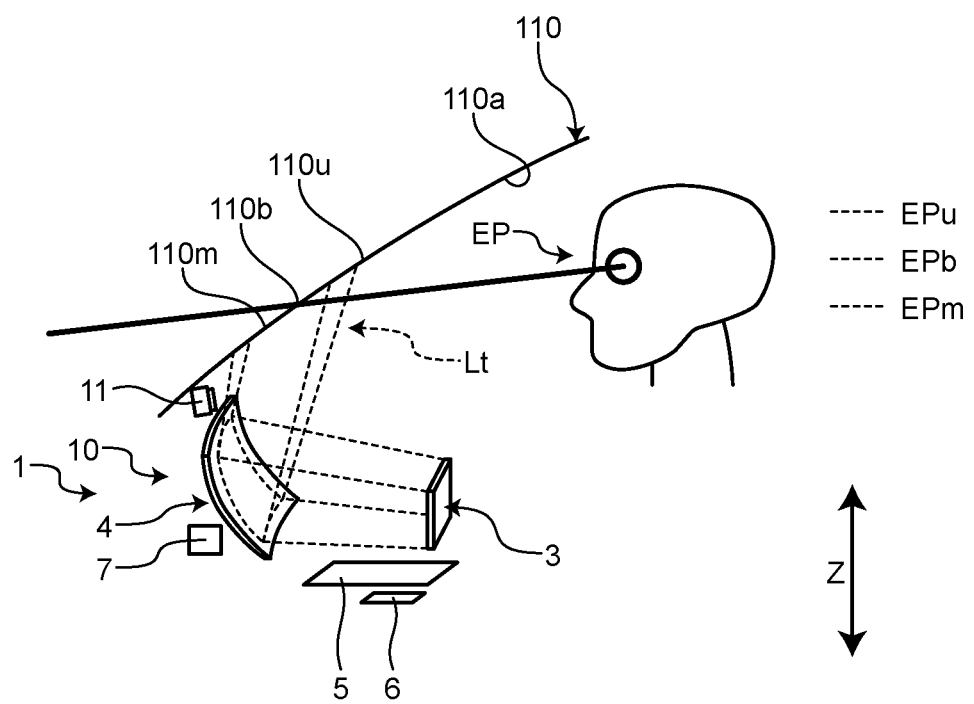
FIG. 11 is a diagram illustrating the adjustment for an image display area.
Figure 12:
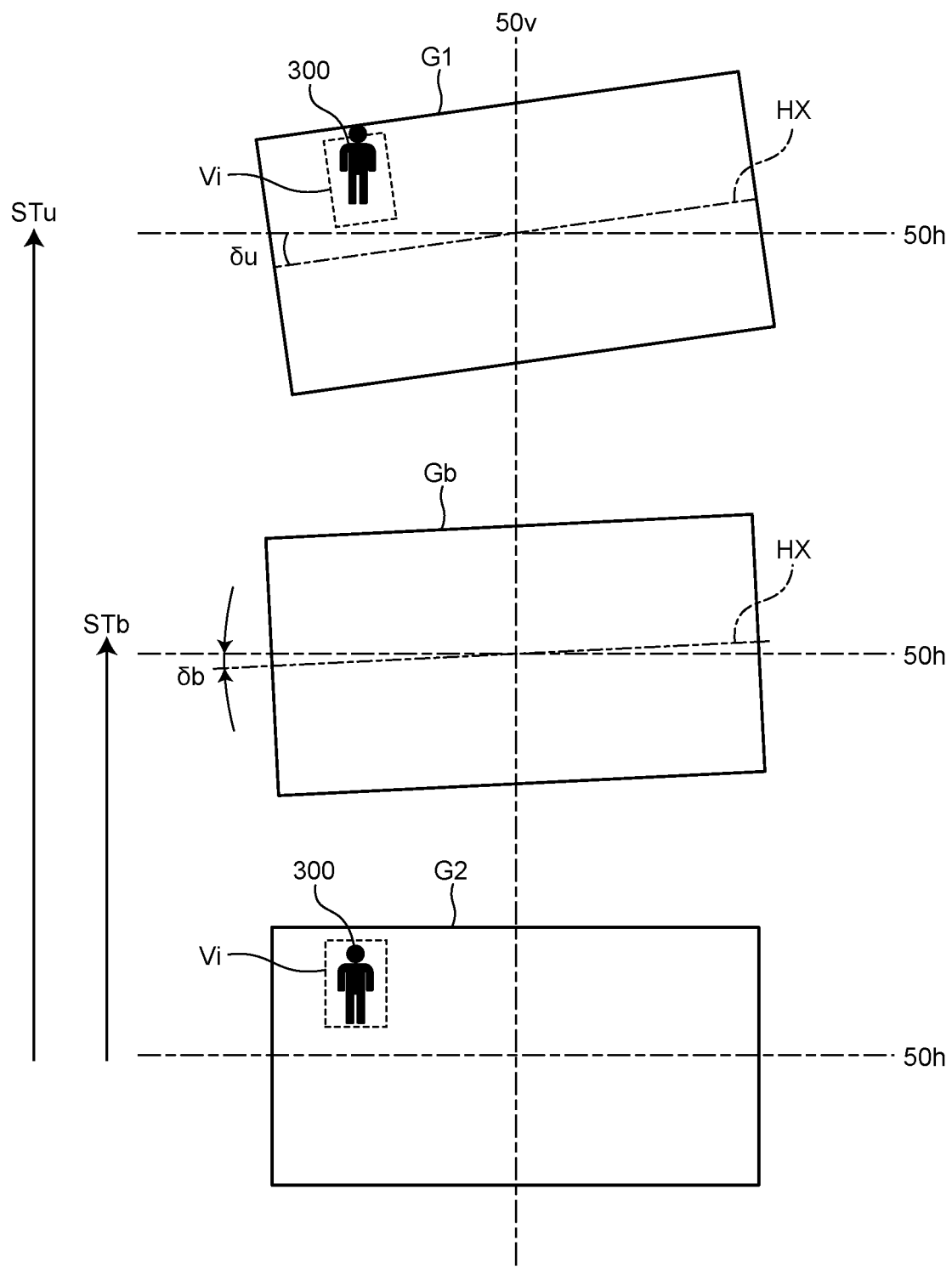
FIG. 12 is a diagram illustrating the adjustment for an image display area.

Embodiments will be described with reference to FIGS. 1 to 13. The present embodiments relate to a method of adjusting a vehicle display device and a vehicle display device. FIG. 1 is a diagram illustrating a virtual image displayed by a vehicle display device according to the present embodiment, FIG. 2 is a diagram illustrating the vehicle display device according to the embodiment, FIG. 3 is a diagram illustrating displacement of the virtual image, FIG. 4 is a diagram illustrating a first adjustment step according to the embodiment, FIG. 5 is a flowchart for an adjustment step according to the embodiment, FIG. 6 is a diagram illustrating images before and after correction, FIG. 7 is a diagram illustrating the correction of an image display area; FIG. 8 is a diagram illustrating a second adjustment step according to an embodiment, FIG. 9 is a diagram illustrating images before and after correction, and FIG. 10 is a block diagram illustrating the vehicle display device according to the embodiment. FIGS. 11 and 12 are diagrams illustrating the adjustment for an image display area, and FIG. 13 is a diagram illustrating the replacement of an image display unit.

As illustrated in FIGS. 1 and 2, a vehicle display device 1 according to the present embodiment is a head-up display device mounted in a vehicle 100, such as an automobile. The vehicle display device 1 projects display light Lt of an image toward a windshield 110. The windshield 110 is positioned in front of the vehicle with respect to an eye point EP of the vehicle 100 and faces the eye point EP in a front-rear direction X of the vehicle. The display light Lt is reflected by a reflective surface 110a of the windshield 110 toward the eye point EP. A driver of the vehicle 100 can visually recognize a virtual image Vi formed by the display light Lt.

As illustrated in FIG. 1, the vehicle display device 1 according to the present embodiment displays the virtual image Vi superimposed on an object 300 in front of the vehicle 100. The object 300 is, for example, a pedestrian, but is not limited to pedestrians. The object 300 may be another vehicle, an obstacle, a road surface, or other objects in front of the vehicle 100. The vehicle 100 is equipped with a forward camera 12 that images the front of the vehicle 100. The vehicle display device 1 determines a projection position of the virtual image Vi and a display position of an image on a display device 3 based on an image acquired by the forward camera 12.

The vehicle display device 1 according to the present embodiment can change the projection position of the image onto the windshield 110 in the up-and-down direction. As illustrated in FIG. 2, the vehicle display device 1 moves the projection position of the image onto the windshield 110 upward or downward according to a position of the eye point EP. The eye point EP is a position of the driver's eyes and is detected by, for example, using a camera 11 of the vehicle display device 1. The exemplified camera 11 is disposed in front of the vehicle with respect to the driver's seat and is installed to image the driver. The eye point EP is detected by image recognition on an image generated by the camera 11.

The vehicle display device 1 includes an image display unit 10 that is mounted in the vehicle 100. The image display unit 10 includes a housing 2, a display device 3, a mirror 4, a control unit 5, a non-volatile memory 6, and a motor 7. The housing 2 is disposed, for example, inside an instrument panel. The housing 2 has an opening facing the windshield 110. The display device 3, the mirror 4, the control unit 5, the non-volatile memory 6, and the motor 7 are housed inside the housing 2.

The display device 3 is a device that displays an image, for example, a liquid crystal display. The display device 3 may be a thin film transistor-liquid crystal display (TFT-LCD). The display device 3 outputs, for example, the display light Lt by light from a backlight unit.

The mirror 4 reflects the display light Lt of the image toward the windshield 110. The display light Lt reflected by the mirror 4 passes through the opening of the housing 2 and is projected onto the reflective surface 110a of the windshield 110. The mirror 4 has a concave reflective surface 4a, which is used to magnify the image. The shape of the reflective surface 4a is, for example, a free-form surface. The reflective surface 4a may be shaped to compensate for distortion and aberration of the image.

The image display unit 10 in the present embodiment includes the motor 7 that rotates the mirror 4. The mirror 4 is supported in a rotatable manner. A rotational direction of the mirror 4 is a direction where a tilted angle θ of the reflective surface 4a varies relative to an up-and-down direction Z of the vehicle, as illustrated by arrow AR1 in FIG. 2. As the tilted angle θ of the mirror 4 increases, the projection position of the image onto the windshield 110 moves downward. By contrast, as the tilted angle θ of the mirror 4 decreases, the projection position of the image onto the windshield 110 moves upward.

The motor 7 rotatably moves the mirror 4 to adjust the tilted angle θ of the reflective surface 4a to a desired angle. The motor 7 is, for example, a stepping motor. The motor 7 is driven by a command value output by the control unit 5. The command value includes a rotational direction and the number of steps for the motor 7.

The control unit 5 controls the display device 3 and the motor 7. The control unit 5 is a computer that includes, for example, an arithmetic unit, a memory, a communication interface, and other components. The control unit 5 controls, for example, the motor 7 according to a computer program stored in advance. The control unit 5 also controls the display device 3 based on the computer program stored in advance and a first correction value and a second correction value read from the non-volatile memory 6.

The control unit 5 according to the present embodiment automatically adjusts the projection position of the image based on a position of the eye point EP. The detection of the eye point EP based on the imaging result of the camera 11 may be performed by the control unit 5 or other processing units. The control unit 5 can also change the projection position of the image by an external command. For example, the control unit 5 can change the projection position in response to an operation input by the driver or in response to a command from an inspection device.

The control unit 5 determines a target value of the tilted angle θ of the mirror 4 according to the position of the eye point EP in the up-and-down direction Z of the vehicle. In FIG. 2, an upper end position EPu, a middle position EPm, and a lower end position EPd of the eye point EP are illustrated. The upper end position EPu, the middle position EPm, and the lower end position EPd are, for example, an upper end position, a middle position, and a lower end position in the up-and-down direction Z of the vehicle at the eye box and the eyellipse.

In a case in which the position of the eye point EP is the middle position EPm, the control unit 5 sets the target value for the tilted angle θ of the mirror 4 to the median value of a movable range. In this case, the image is projected onto the windshield 110 at a position 110m. The position 110m is the middle position in the up-and-down direction within a projection range of the image.

In a case in which the position of the eye point EP is the upper end position EPu, the control unit 5 sets the target value for the tilted angle θ of the mirror 4 to the minimum value. In this case, the image is projected onto the windshield 110 at a position 110u. The position 110u is the upper end position within the projection range of the image. In a case in which the position of the eye point EP is the lower end position EPd, the control unit 5 sets the target value for the tilted angle θ of the mirror 4 to the maximum value. In this case, the image is projected at a position 110d of the windshield 110. The position 110d is the lower end position within the projection range of the image.

Here, rotational displacement may occur in the image projected onto the windshield 110. The rotational displacement of the image in a case in which the projection position of the image is changed upward and downward is illustrated in FIG. 3. A regular horizontal axis 50h, a regular vertical axis 50v, and an image horizontal axis HX are illustrated in FIG. 3. The regular horizontal axis 50h is along a regular horizontal axis direction in a case of being viewed from the eye point EP. In other words, the regular horizontal axis 50h is a reference axis in an image horizontal direction GH. The regular horizontal axis 50h is, for example, an axis extending to a width direction or a horizontal direction of the vehicle.

The regular vertical axis 50v is along a regular vertical axis direction in a case of being viewed from the eye point EP. In other words, the regular vertical axis 50v is a reference axis in an image vertical direction GV. The regular vertical axis 50v is, for example, an axis extending to an up-and-down direction Z or a vertical direction of the vehicle. The image horizontal axis HX is along a horizontal axis direction of the projected virtual image Vi.

Images G1, G2, and G3 are illustrated in FIG. 3. The image G1 is an image projected at the position 110u and visually recognized from the upper end position EPu. The image G2 is an image projected at the position 110m and visually recognized from the middle position EPm. The image G3 is an image projected at the position 110d and visually recognized from the lower end position EPd.

In FIG. 3, the image horizontal axis HX in the image G2 is along the regular horizontal axis 50h. The image horizontal axis HX in each of the images G1 and G3 is tilted with respect to the regular horizontal axis 50h. More specifically, the image horizontal axis HX of the image G1 is out of phase with the regular horizontal axis 50h in a counter-clockwise rotational direction in a case of being viewed from the eye point EP. By contrast, the image horizontal axis HX of the image G3 is out of phase with the regular horizontal axis 50h in the clockwise rotational direction in a case of being viewed from the eye point EP. Such displacement of the image horizontal axis HX includes the positional displacement due to tolerances of various parts in the image display unit 10, and the positional displacement due to tolerances in the vehicle 100.

The control unit 5 of the present embodiment corrects an image display area of the display device 3 based on a first correction value and a second correction value described later. The first correction value is a correction value based on an inspection result for a stand-alone image display unit 10 that is not mounted in the vehicle 100. The correction in the image display area with the first correction value results in cancellation on the tilt of the image horizontal axis HX, which is caused by the image display unit 10. The second correction value is a correction value based on an inspection result for the image display unit 10 that is mounted in the vehicle 100. The correction in the image display area with the second correction value results in cancellation on the tilt of the image horizontal axis HX, which is caused by the vehicle 100.

The vehicle display device 1 according to the present embodiment stores each of the first correction value and the second correction value independently in the non-volatile memory 6 as separate correction values. Accordingly, the tilt of the image horizontal axis HX in the vehicle display device 1 can be efficiently adjusted as described below. For example, the adjustment procedure when the image display unit 10 is installed in the vehicle 100 is readily carried out. The adjustment procedure when the image display unit 10 is replaced is also readily carried out.

First, a step of calculating the first correction value will be described. In the following description, the step of calculating the first correction value and writing the calculated value into the non-volatile memory 6 is referred to as a first adjustment step. In the first adjustment step, the first correction value is calculated by a first inspection described below.

As illustrated in FIG. 4, the first adjustment step is performed by using an inspection device that includes a windshield 200 for inspection, a target board 210, an inspection table 220, cameras 230, and a control device 240. The first adjustment step is performed, for example, at a factory where the image display unit 10 is manufactured. The inspection table 220 is a platform that imitates the position at which the image display unit 10 in the vehicle 100 is mounted. The windshield 200 has a reflective surface 200a formed in the same manner as the windshield 110 of the vehicle 100. The positional relationship between the inspection table 220 and the windshield 200 is set to reproduce the positional relationship between the image display unit 10 and the windshield 110, which are mounted in the vehicle 100.

The cameras 230 image images viewed from the eye point EP. The cameras 230 are constituted of three cameras 230u, 230m, and 230d. The camera 230u can be disposed to image the same image as viewed from the upper end position EPu of the vehicle 100. Similarly, the cameras 230m and 230d can be disposed to image the same image as viewed from the middle position EPm and the lower end position EPd of the vehicle 100, respectively.

The target board 210 serves as a reference, for example, to detect the positional displacement of the projection image with respect to the regular position. The target board 210 may serve as a reference to detect the tilt of the image horizontal axis HX with respect to the regular horizontal axis 50$h$. The target board 210 is disposed on the opposite side to the camera 230 side with respect to the windshield 200. The position of the target board 210 is, for example, the background of the image as viewed from the camera 230.

The control device 240 controls the image display unit 10 and the cameras 230. The control device 240 transmits commands to the control unit 5 of the image display unit 10 to control the tilted angle θ of the mirror 4 and the image display by the display device 3. The control device 240 also controls the cameras 230 and acquires inspection images imaged by the cameras 230.

Referring to FIG. 5, the operation of the first adjustment step will be described. At step S10, an operator installs the cameras 230. Once the step S10 has been performed, the processing proceeds to step S20.

At the step S20, an error between an actual object and a virtual image is confirmed. The operator operates the control device 240 to cause the image display unit 10 to project an image. The control device 240 gives the control unit 5 a command to move the virtual image upward and downward. The control device 240 gives the control unit 5 commands to set the tilted angle θ of the mirror 4, for example, to an angle corresponding to the upper end position EPu, the middle position EPm, or the lower end position EPd. The control device 240 also gives the display device 3 a command to display the image.

Images G1, G2, and G3 before correction are illustrated on the left side of FIG. 6, and images G1, G2, and G3 after correction are illustrated on the right side of FIG. 6. The control device 240 inspects displacements of the images G1, G2, and G3 with respect to a regular position for each of the images G1, G2, and G3. An inspection for detecting the displacement of the image G2 as viewed from the middle position EPm is illustrated in FIG. 4. In a case in which the inspection is carried out on the displacement of the image G2 with respect to the middle position EPm, the control device 240 causes the tilted angle θ of the mirror 4 to be at an angle corresponding to the middle position EPm. As illustrated in FIG. 4, the image display light Lt is then projected at a position 200$m$ of the windshield 200. The position 200$m$ corresponds to a position 110$m$ of the windshield 110.

The camera 230$m$ images the image G2 and the target board 210 according to the commands from the control device 240. Based on the inspection image imaged by the camera 230$m$, the positional displacement of the image G2 viewed from the middle position EPm is inspected. As illustrated in FIG. 4, the target board 210 has a mark 210$t$ that imitates an object. The control device 240 carries out image recognition on the inspection image acquired from the camera 230$m$ to detect the displacement amount of the virtual image Vi with respect to the mark 210$t$. The amount of displacement is the amount corresponding to the tilt of the image horizontal axis HX with respect to the regular horizontal axis 50$h$. The larger the tilted angle of the image horizontal axis HX, the greater the displacement amount of the virtual image Vi with respect to the mark 210$t$. In other words, the tilted angle of the image horizontal axis HX can be estimated based on the displacement amount of the virtual image Vi.

The displacement amount of the image G1 corresponding to the upper end position EPu and the displacement amount of the image G3 corresponding to the lower end position EPd can also be detected in the same way. For example, in a case of detecting the displacement amount of the image G1, the control device 240 causes the tilted angle θ of the mirror 4 to be an angle corresponding to the upper end position EPu. The camera 230$u$ images the image G1 and the target board 210 to generate an inspection image. The control device 240 detects the displacement amount between the virtual image Vi and the mark 210$t$ of the image G1. When the displacement amount is detected, the processing proceeds to step S30.

At the step S30, the control device 240 determines whether a rotational display displacement has occurred. The control device 240 performs the determination at the step S30 based on the displacement amount calculated at the step S20. In a case in which the displacement amount is greater than a threshold value, the positive determination is made at the step S30 and the processing proceeds to step S40; in a case in which the displacement amount is equal to or smaller than the threshold value, the negative determination is made and the processing proceeds to step S60.

In the step S40, a correction value for the rotational display displacement is calculated. The control device 240 calculates the first correction value according to the displacement amount. The control device 240 may confirm whether the rotational display displacement has been eliminated by the calculated first correction value. In other words, the image display area on the display device 3 may be corrected based on the first correction value to confirm whether the virtual image Vi has been correctly superimposed on the mark 210$t$ in the image after correction.

With reference to FIG. 7, the correction of the image display area will be described. The image G1 before and after correction and an image display area 31$u$ before and after correction are illustrated in FIG. 7. An image display area 31 is a partial area on a display surface 3$a$ of the display device 3. The image display area 31$u$ is an image display area 31 used corresponding to the upper end position EPu. The image display area 31 is set to also each of the middle position EPm and the lower end position EPd. A shape of the image display area 31 is defined based on a distortion that occurs in an optical system from the display surface 3$a$ to the eye point EP. The shape of the image display area 31 is set so that the images G1, G2, and G3 reflected by the windshield 110 toward the eye point EP are formed in a rectangular shape, for example.

As illustrated in FIG. 7, in a case in which the image horizontal axis HX is tilted with respect to the regular horizontal axis 50$h$, the correction is made to eliminate the tilt. A tilted angle δ of the image horizontal axis HX with respect to the regular horizontal axis 50$h$ is illustrated in FIG. 7. A first correction value and a second correction value described later are set to reduce this tilted angle δ. The correction values may be set so that the tilted angle δ is set to zero.

In a case in which the first correction value is stored in the non-volatile memory 6, the control unit 5 corrects the image display area 31 based on the first correction value. The first correction value is a correction angle [deg] with respect to the image display area 31. The control unit 5 rotates the image display area 31$u$ of the image G1 based on the first correction value. A rotational direction is the direction where the tilted angle δ is reduced. Accordingly, the tilt of the image G1 is canceled with respect to the regular horizontal axis 50$h$ in the image G1 after correction. The image G1 after correction is illustrated on the upper right portion of FIG. 6. In the image G1 after correction, the virtual image Vi is correctly superimposed on the mark 210t.

In a case in which the displacement of the virtual image Vi with respect to the mark 210t is not eliminated in the image G1 after correction, the control device 240 may adjust the first correction value. The control device 240 may repeat the adjustment for the first correction value until the displacement of the virtual image Vi is eliminated. Once the first correction value is determined, the processing proceeds to step S50.

At the step S50, the control device 240 writes the correction values into the memory. The control device 240 writes the first correction value determined at the step S40 into the non-volatile memory 6 of the image display unit 10. Once the step S50 has been performed, the processing proceeds to step S70.

At the step S60, the control device 240 writes "0" as the correction value into the non-volatile memory 6. Once the step S60 has been performed, the processing proceeds to step S70.

At the step S70, the control device 240 determines whether setting of the first correction value for all of the upper end position EPu, the middle position EPm, and the lower end position EPd is completed. The control device 240 allows the processing to proceed to the step S10 in a case in which there is a position to which the first correction value has not been set, among the upper end position EPu, the middle position EPm, and the lower end position EPd. In this case, the control device 240 carries out detection of displacement and calculation of the first correction value on an image in which setting of the first correction value has not yet been completed, among the images G1, G2, and G3.

On the other hand, in a case in which the first correction values for all of the upper end position EPu, the middle position EPm, and the lower end position EPd have been written into the non-volatile memory 6, the control device 240 makes the positive determination at the step S70 to end the processing.

The correction of the image display area 31 with the first correction value for each of the upper end position EPu, the middle position EPm, and the lower end position EPd is carried out to eliminate the tilt in the images G1, G2, and G3 after correction, as illustrated on the right side of FIG. 6. In other words, the first correction value eliminates rotational display displacement due to individual differences in the image display unit 10.

Next, a step of calculating the second correction value will be described. In the following description, the step of calculating the second correction value and writing the calculated value into the non-volatile memory 6 is referred to as a second adjustment step. In the second adjustment step, the second correction value is calculated by a second inspection described below. The second adjustment step is performed after the first adjustment step.

As illustrated in FIG. 8, the second adjustment step is performed by installing the image display unit 10 in the vehicle 100. The second adjustment step is performed, for example, at a factory where the image display unit 10 is mounted in the vehicle 100. The image display unit 10 illustrated in FIG. 8 is assembled to the vehicle 100 and secured to the vehicle 100. In the second inspection, cameras 130 are installed in the vehicle 100. The cameras 130 are installed in, for example, the driver's seat of the vehicle 100.

The cameras 130 are constituted of three cameras 130u, 130m, and 130d. The camera 130u can be disposed to image the same image as viewed from the upper end position EPu of the vehicle 100. Similarly, the cameras 130m and 130d can be disposed to image the same image as viewed from the middle position EPm and the lower end position EPd of the vehicle 100, respectively.

In the second inspection, for example, the target board 210 and the control device 240 are used in the same manner as in the first inspection. The target board 210 is disposed on the opposite side to the windshield 110 from the camera 130 side. The position of the target board 210 is, for example, the background of the image as viewed from the cameras 130.

The control device 240 is connected to the image display unit 10 and the cameras 130 so that the control device 240, the image display unit 10, and the cameras 130 can communicate with each other. The control device 240 executes the processing according to the flowchart in FIG. 5. At step S40 of the second adjustment step, the second correction value is calculated, and at each of steps S50 and S60, the second correction value is written into the non-volatile memory 6.

Images G1, G2, and G3 before correction and images G1, G2, and G3 after correction at the second adjustment step are illustrated in FIG. 9. The images G1, G2, and G3 before correction are projected with the image display area 31 corrected with the first correction value. In other words, in the images G1, G2, and G3 before correction, errors due to individual differences in the vehicle display device 1 have already been corrected. Therefore, the positional displacement of the virtual image Vi in each of the images G1, G2, and G3 before correction is mainly caused by the vehicle 100.

An inspection for detecting the displacement of the image G2 as viewed from the middle position EPm is illustrated in FIG. 8. In a case in which the detection is carried out on the displacement of the image G2 with respect to the middle position EPm, the control device 240 causes the tilted angle θ of the mirror 4 to be at an angle corresponding to the middle position EPm. As illustrated in FIG. 8, the image display light Lt is then projected at a position 110m of the windshield 110. The camera 130m images the image G2 and the target board 210 according to the commands from the control device 240. Based on the inspection image imaged by the camera 130m, the positional displacement of the image G1 viewed from the middle position EPm is inspected. The control device 240 calculates the second correction value for the image G2 based on the detected displacement amount and writes the second correction value into the non-volatile memory 6.

The inspection is carried out on each of the displacement of the image G1 corresponding to the upper end position EPu and the displacement of the image G3 corresponding to the lower end position EPd, and the second correction value is written into the non-volatile memory 6.

With reference to FIGS. 9 and 10, the correction for a position where an image is displayed will be further described. The non-volatile memory 6 is provided outside the control unit 5 as illustrated in FIG. 10, for example. The non-volatile memory 6 is, for example, EEPROM. A first correction value V1, a second correction value V2, and a total correction value VT are written into the non-volatile memory 6. The control unit 5 corrects each image display area 31 according to the total correction value VT. In the non-volatile memory 6, dedicated storage areas for the first correction value V1, the second correction value V2, and the total correction value VT may be provided individually.

Each of the first correction value V1 and the second correction value V2 according to the present embodiment is the rotation correction value [deg] of the image display area 31 on the display device 3. The correction values V1 and V2 are, for example, rotation angles with the center point of the image display area 31 as a rotation axis. Correction values for the counter-clockwise rotation of the images G1, G2, and G3 as viewed from the eye point EP may be positive values. Correction values for the clockwise rotation of the images G1, G2, and G3 as viewed from the eye point EP may be negative values.

The control unit 5 calculates the total correction value VT from the first correction value V1 and the second correction value V2. The total correction value VT is, for example, the sum of the first correction value V1 and the second correction value V2. The total correction value VT includes a correction value VTu corresponding to the upper end position EPu, a correction value VTm corresponding to the middle position EPm, and a correction value VTd corresponding to the lower end position EPd. The control unit 5 carries out rotation correction for the image display area 31 based on the total correction value VT. For example, in a case of displaying the image G3 corresponding to the lower end position EPd, the control unit 5 rotates and corrects the image display area 31 based on the correction value VTd.

In a case in which the position of the eye point EP is not matched with any of the upper end position EPu, the middle position EPm, and the lower end position EPd, the control unit 5 according to the present embodiment calculates the total correction value VT by linear interpolation. A position EPb of the detected eye point EP is illustrated in FIG. 11. The position EPb is a position between the middle position EPm and the upper end position EPu. A position 110b of the windshield 110 is a projection position corresponding to the position EPb of the eye point EP.

FIG. 12 is a diagram for illustrating linear interpolation in a case in which the position of the eye point EP is EPb. The image Gb illustrated in the middle of FIG. 12 is an image before correction, which corresponds to a position EPb of the eye point EP. In other words, the image Gb is an image that is visually recognized from the position EPb in a case in which the image display area 31 is not corrected with the first correction value V1 and the second correction value V2.

The image G2 before correction, which corresponds to the middle position EPm of the eye point EP, is illustrated on the lower portion of FIG. 12. The image G1 before correction, which corresponds to the upper end position EPu of the eye point EP, is illustrated on the upper portion of FIG. 12. In the example illustrated in FIG. 12, the image G2 is not tilted with respect to the regular horizontal axis 50h, so the total correction value VTm is 0. On the other hand, a value of non-zero is set to the image G1 as the total correction value VTu. The value of the total correction value VTu is defined according to a tilted angle δu.

On the left side of FIG. 12, the number of steps STu and the number of steps STb of the motor 7 are illustrated. The number of steps STu is the number of steps of the motor 7 when the projection position of the windshield 110 is moved from the position 110m to the position 110u. The number of steps STb is the number of steps of the motor 7 when the projection position of the windshield 110 is moved from the position 110m to the position 110b.

In this case, the total correction value VTb corresponding to the image display area 31 of the position EPb is calculated by the following equation (1).

$$VTb = VTu \times STb/STu \tag{1}$$

In a case in which the position EPb of the eye point EP is between the middle position EPm and the lower end position EPd, the total correction value VTb is calculated by the following equation (2). The number of steps STd is the number of steps of the motor 7 when the projection position of the windshield 110 is moved from the position 110m to the position 110d.

$$VTb = VTd \times STb/STd \tag{2}$$

According to the method of adjusting a vehicle display device of the present embodiment, the first correction value V1 for compensating the inherent error of the image display unit 10 is calculated in the first adjustment step. The second correction value V2 for compensating the inherent error of the vehicle 100 is calculated in the second adjustment step. As described above, the two correction values V1 and V2 are calculated separately, thereby enabling efficient adjustment of the positional displacement of the image display area 31.

As a comparative example for the present embodiment, it will be considered that an adjustment method of adjusting all of errors after the image display unit 10 is mounted in the vehicle 100. In this case, a large positional displacement may occur because errors of the image display unit 10 and errors of the vehicle 100 are accumulated. As a result, the number of times the positional displacement is adjusted increases, which can easily lead to a decrease in efficiency.

In contrast, according to the method of adjusting a vehicle display device of the present embodiment, the number of times the positional displacement is adjusted in the first adjustment step and the second adjustment step is reduced, and the efficiency of each adjustment step is improved. In the method of adjusting a vehicle display device according to the present embodiment, the image display area 31 on the display device 3 is adjusted to correct the positional displacement of the image. Accordingly, the efficiency is improved as compared with a method of reducing the positional displacement of the image by mechanical adjustment of changing positions or angles of components or changing the way of installing the housing 2.

In addition, according to the vehicle display device 1 of the present embodiment, the adjustment procedure when the image display unit 10 is replaced is also made efficient as described below. Data migration during the replacement of the image display unit 10 is illustrated in FIG. 13. In FIG. 13, a vehicle display device 1x is the vehicle display device 1 and is to be removed from the vehicle 100 due to failure or other reasons, and an image display unit 10x is the image display unit 10 of the vehicle display device 1x to be removed. A vehicle display device 1i is the vehicle display device 1 and is to be newly mounted in the vehicle 100, and an image display unit 10i is the image display unit 10 of the new vehicle display device 1i. The first adjustment step has been performed on the image display unit 10i, and a first correction value V1 has been written into the non-volatile memory 6.

A second correction value V2 of the image display unit 10x to be removed is transferred to the new image display unit 10i to be installed. The transfer of the second correction value V2 is carried out by, for example, using a service tool. In this case, the service tool reads out the second correction value V2 from the image display unit 10x to be removed and writes the read second correction value V2 into the non-volatile memory 6 of the new image display unit 10i. The control unit 5 of the image display unit 10i calculates a total correction value VT by adding the first correction value V1 specific to this image display unit 10i and the transferred second correction value V2.

The second adjustment step is performed on the image display unit 10i installed in the vehicle 100. In the second adjustment step, the positional displacement of each of the images G1, G2, and G3 is detected by the second inspection.

The image display position in the display device 3 at this time is corrected based on the transferred second correction value V2. In other words, the display device 3 of the new image display unit 10*i* displays an image which the image display area 31 has been corrected by the transferred second correction value V2.

Therefore, even though the positional displacement of the image occurs at the second inspection, the positional displacement is less likely to be significant. In a case in which the detected amount of the positional displacement is out of a standard value, values of second correction values V2*u*, V2*m*, and V2*d* are changed. For example, in a case in which the positional displacement out of an allowable range occurs in the image G1 at the upper end position EPu, the second correction value V2*u* is adjusted to reduce this positional displacement, and the adjusted second correction value V2*u* is written into the non-volatile memory 6.

According to the second adjustment step described above, the adjustment procedure for the vehicle display device 1 is made more efficient. For example, the display positions of the images G1, G2, and G3, which are firstly displayed in the second adjustment step, are corrected by the transferred second correction value V2. Therefore, the time required to adjust the second correction value V2 to an appropriate value is reduced as compared to the case of adjusting the image display unit 10 with the second correction value V2 remaining at its initial value.

The presence or absence of the positional displacement and the amount of the positional displacement may be visually confirmed by the operator. In this case, the operator visually confirms the positional displacement of each of the images G1, G2, and G3 and inputs the presence or absence of positional displacement and the amount of the positional displacement to the control device 240. The control device 240 calculates a first correction value or a second correction value from the input amount of the positional displacement and writes the first correction value or the second correction value into the non-volatile memory 6.

The amount of the positional displacement may be a tilted angle of the image horizontal axis HX with respect to the regular horizontal axis 50*h* marked on the target board 210. In this case, the image projected by the display device 3 preferably includes a line indicating the image horizontal axis HX. The amount of the positional displacement may be a tilted angle of the image vertical axis with respect to the regular vertical axis 50*v* marked on the target board 210. In this case, the image projected by the display device 3 preferably includes a line indicating the image vertical axis.

As described above, the method of adjusting a vehicle display device according to the present embodiment includes the first adjustment step and the second adjustment step. The vehicle display device 1 can change the projection positions of the images onto the windshields 110 and 200 in the up-and-down direction. The first adjustment step is a step of performing the first inspection on the vehicle display device 1, calculating the first correction value V1, and writing the first correction value V1 into the non-volatile memory 6 of the vehicle display device 1. The second adjustment step is a step of performing the second inspection on the vehicle display device 1, calculating the second correction value V2, and writing the second correction value V2 into the non-volatile memory 6 of the vehicle display device 1. The first and second inspections correspond to, for example, the steps S10 to S40 of the flowchart. The procedure for writing the first correction value V1 and the second correction value V2 into the non-volatile memory 6 corresponds to the steps S50 and S60, for example.

The first correction value V1 and the second correction value V2 are values with which the image display area 31 is corrected in the display device 3 of the vehicle display device 1 to reduce the tilt of the axis of the projection image with respect to the regular axis direction of the image horizontal direction GH or the image vertical direction GV. The two correction values V1 and V2 are, for example, rotation angles for correcting the image display area 31 so that the tilt of the image horizontal axis HX is reduced with respect to the regular horizontal axis 50*h*.

In the first inspection, the vehicle display device 1 is installed on the inspection table 220 and projects an image onto the windshield 200 for inspection. The first correction value V1 is calculated based on the displacement amount according to the tilt of the axis in the image with respect to the regular axis direction when the image is projected onto the windshield 200 for inspection. This displacement amount may be, for example, the displacement amount of the virtual image Vi with respect to the mark 210*t*, the tilted angle δ of the image horizontal axis HX with respect to the regular horizontal axis 50*h*, or the tilted angle of the vertical axis of the image with respect to the regular vertical axis 50*v*.

In the second inspection, the vehicle display device 1 is installed in the vehicle 100 and projects an image onto the windshield 110 of the vehicle 100. The second correction value V2 is calculated based on the displacement amount according to the tilt of the axis in the image with respect to the regular axis direction when the image is projected onto the windshield 110 of the vehicle 100. In the second inspection, the display device 3 displays an image to the image display area 31 that is corrected with the first correction value V1. The method of adjusting a vehicle display device according to the present embodiment can efficiently adjust the positional displacement in the rotational direction by separately determining the correction values for two positional displacements with different causes. For example, the adjustment of the positional displacement when the vehicle display device 1 is mounted in the vehicle 100 is made more efficient. In the second inspection, the image is displayed in the image display area 31 that has been corrected with the first correction value V1. Therefore, the method of adjusting a vehicle display device according to the present embodiment can improve the efficiency of the procedure at the second adjustment step.

In the method of adjusting a vehicle display device according to the present embodiment, in a case in which the vehicle display device 1 is replaced in the vehicle 100, the second correction value V2 of the vehicle display device 1 to be removed from the vehicle 100 is transferred to the non-volatile memory 6 of the new vehicle display device 1 to be installed in the vehicle 100. The display device 3 of the new vehicle display device 1 displays an image to the image display area 31 that has been corrected with the transferred second correction value V2 in the second inspection. Thus, the second adjustment step for the new vehicle display device 1 is made more efficient.

The vehicle display device 1 according to the present embodiment includes the image display unit 10 that is mounted in the vehicle 100 and capable of changing the projection position of the image onto the windshield 110 in the up-and-down direction. The image display unit 10 includes the display device 3 that displays an image, the mirror 4 that reflects the image display light Lt toward the windshield 110, the non-volatile memory 6 that stores the first correction value V1 and the second correction value V2, and the control unit 5 that controls the display device 3.

The control unit 5 corrects the image display area 31 of the display device 3 based on the first correction value V1 and the second correction value V2 according to the projection position of the image onto the windshield 110 in the up-and-down direction. The correction carried out on the image display area 31 of the display device 3 is a correction for reducing the tilt of the axis of the projection image with respect to the regular axis direction of the image horizontal direction GH or the image vertical direction GV.

The first correction value V1 is a correction value based on the inspection result for the stand-alone image display unit 10 that is not mounted in the vehicle 100. The second correction value V2 is a correction value based on the inspection result for the image display unit 10 mounted in the vehicle 100, and based on the inspection result for the image display unit 10 which the image display area 31 has been corrected with the first correction value V1. The vehicle display device 1 according to the present embodiment can efficiently adjust the positional displacement of the image display area 31 by separately performing the inspections for the first correction value V1 and the second correction value V2. For example, the adjustment of the positional displacement when the vehicle display device 1 is mounted in the vehicle 100 is made more efficient. The second correction value V2 is based on the inspection result for the image display unit 10 which the image display area 31 has been corrected with the first correction value V1. Thus, the efficiency of the step of determining the second correction value V2 is improved.

The non-volatile memory 6 may be a memory provided inside the control unit 5. The non-volatile memory 6 is not limited to EEPROM, and may be flash memory, for example. The non-volatile memory 6 into which the second correction value V2 is written may be a memory of a storage medium that is detachable from the image display unit 10.

Means for changing the projection positions of the images onto the windshields 110 and 200 is not limited to the mirror 4 and the motor 7. For example, the image display unit 10 may adjust the projection position by moving the image display area 31 in the up-and-down direction of the image in the display device 3.

The contents disclosed in the above embodiments may be combined and implemented as appropriate.

The method of adjusting a vehicle display device according to the present embodiment includes the step of performing the first inspection on the inspection table, calculating the first correction value, and writing the calculated value into the non-volatile memory, and a step of performing the second inspection on the vehicle, calculating the second correction value, and writing the calculated value into the non-volatile memory. The vehicle display device according to the present embodiment includes the first correction value based on the inspection result for the stand-alone image display unit that is not mounted in the vehicle and the second correction value based on the inspection result for the image display unit that is mounted in the vehicle, the first correction value and the second correction value being stored in the non-volatile memory. According to the method of adjusting a vehicle display device and the vehicle display device of the present embodiment, it is possible to efficiently adjust the positional displacement due to the tilt of the image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of adjusting a vehicle display device for a vehicle having a first windshield, the method comprising:
performing a first inspection on the vehicle display device capable of changing a projection position of an image onto a second windshield in an up-and-down direction, calculating a first correction value, and writing the first correction value into a non-volatile memory of the vehicle display device; and
performing a second inspection on the vehicle display device capable of changing a projection position of an image onto the first windshield in an up-and-down direction, calculating a second correction value, and writing the second correction value into the non-volatile memory of the vehicle display device, wherein
each of the first correction value and the second correction value is a value with which an image display area is corrected with respect to a display device of the vehicle display device so that a tilt of an axis of the projection image is reduced with respect to a regular axis direction of an image horizontal direction or an image vertical direction,
in the first inspection,
the vehicle display device is installed on an inspection table and projects an image onto the second windshield for inspection, and
the first correction value is calculated based on a displacement amount according to a tilt of an axis of the image with respect to the regular axis direction when the image is projected onto the second windshield for inspection,
in the second inspection,
the vehicle display device is installed in the vehicle and projects an image onto the first windshield of the vehicle, and
the second correction value is calculated based on a displacement amount according to a tilt of an axis of the image with respect to the regular axis direction when the image is projected onto the first windshield of the vehicle,
in the second inspection,
the display device displays an image to the image display area that has been corrected with the first correction value, and
the first windshield is different from the second windshield.

2. The method of adjusting a vehicle display device according to claim 1, wherein
in a case in which the vehicle display device in the vehicle is replaced by a new vehicle display device that is to be newly installed in the vehicle, the second correction value of the vehicle display device that is to be removed from the vehicle is transferred to the non-volatile memory of the new vehicle display device, and
the display device of the new vehicle display device displays an image to the image display area that has been corrected with the transferred second correction value in the second inspection.

3. The method of adjusting a vehicle display device according to claim 1, further comprising:
summing of the first correction value and the second correction to obtain a total correction value; and
correcting an image display area of the display device according to the total correction value.

4. A vehicle display device comprising:
an image display unit that is mounted in a vehicle and capable of changing a projection position of an image onto a windshield in an up-and-down direction, wherein
the image display unit includes
 a display device that displays an image,
 a mirror that reflects display light of the image toward the windshield
 a non-volatile memory that stores a first correction value and a second correction value, and
 a control unit that controls the display device, wherein
the control unit corrects an image display area of the display device according to the projection position of the image in the up-and-down direction with respect to the windshield,
the correction on the image display area of the display device is a correction for reducing a tilt of an axis of a projection image with respect to a regular axis direction of an image horizontal direction or an image vertical direction,
the first correction value is a correction value based on an inspection result for the image display that is a stand-alone image display unit that is not mounted in the vehicle,
a corrected image display area is the display area that has been corrected with the first correction value, and
the second correction value is a correction value based on an inspection result for the image display unit that is mounted in the vehicle and displays the corrected image display area.

\* \* \* \* \*